United States Patent [19]

Pimm et al.

[11] Patent Number: 4,897,786
[45] Date of Patent: Jan. 30, 1990

[54] BUS WINDOW INTERLOCK

[75] Inventors: David W. Pimm, Nashua, N.H.; Paul J. Natusch, Westford; Robert T. Silver, Marlboro, both of Mass.

[73] Assignee: Digital Equipment Corporation, Maynard, Mass.

[21] Appl. No.: 93,501

[22] Filed: Sep. 4, 1987

[51] Int. Cl.⁴ .......................... G06F 15/16; G06F 9/46
[52] U.S. Cl. .................................................. 364/200
[58] Field of Search ... 364/200 MS File, 900 MS File; 340/825.5

[56] References Cited

U.S. PATENT DOCUMENTS

| | | | |
|---|---|---|---|
| 3,801,962 | 4/1974 | Moore et al. | 364/200 |
| 4,035,777 | 7/1977 | Moreton | 364/200 |
| 4,123,794 | 10/1978 | Matsumoto | 364/200 |
| 4,136,386 | 1/1979 | Annunziata et al. | 364/200 |
| 4,257,099 | 3/1981 | Appelt | 364/200 |
| 4,449,182 | 5/1984 | Rubinsen et al. | 364/200 |
| 4,481,573 | 11/1984 | Fukunaga et al. | 364/200 |
| 4,494,193 | 1/1985 | Brahm et al. | 364/200 |
| 4,547,845 | 10/1985 | Ross | 364/200 |
| 4,570,217 | 2/1986 | Arlen et al. | 364/900 |
| 4,713,834 | 12/1987 | Brahm et al. | 379/28 |

Primary Examiner—Emanuel S. Kemeny
Assistant Examiner—Christopher H. Lynt

[57] ABSTRACT

A system for implementing a bus window interlock scheme between a first and a second bus utilizes two bus window modules. The first bus window module coupled to the processor bus includes an interlock state bit which is set upon the acceptance of an interlock transaction from a processor. No further interlock transactions will be accepted while the interlock state bit is set. The interlock transaction is passed to a transaction buffer in the second bus window module which is coupled to memory through the memory bus. The transaction buffer passes the interlock data for memory to the memory bus while simultaneously loading a one deep interlock buffer. A confirmation is sent from the memory back to the transaction buffer. If the confirmation is interlock busy, then the interlock transaction is retried from the interlock buffer thus allowing the transaction buffer to process other commands. The interlock buffer waits for an unlock write signal before retrying an interlock transaction thus alleviating congestion on the memory bus.

19 Claims, 11 Drawing Sheets

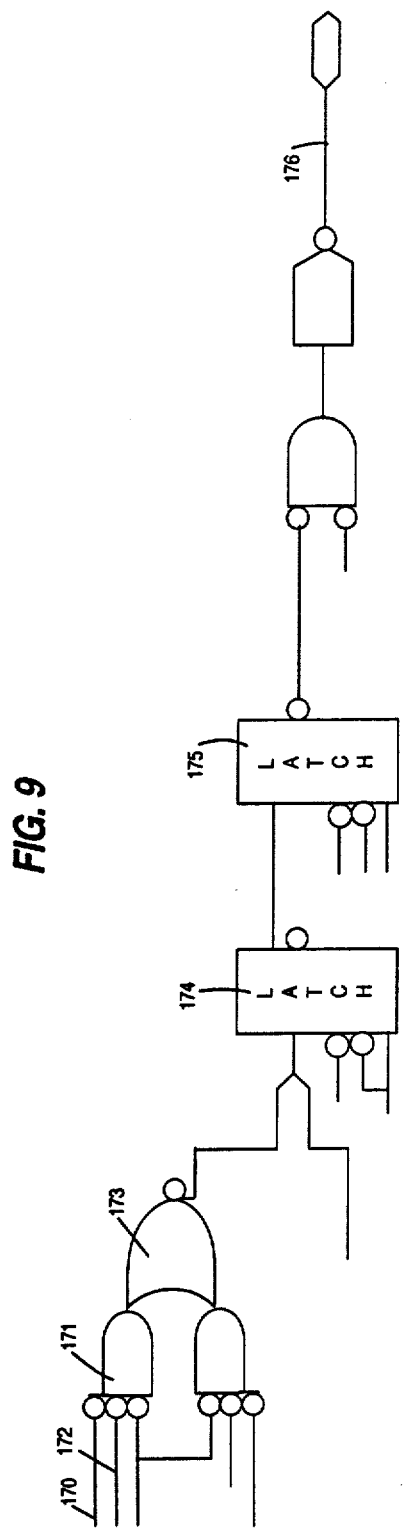
FIG. 9
FIG. 9a
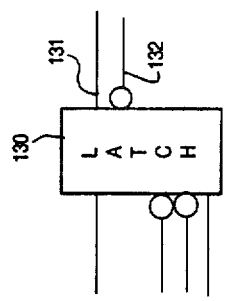
TABLE
FIG. 9d

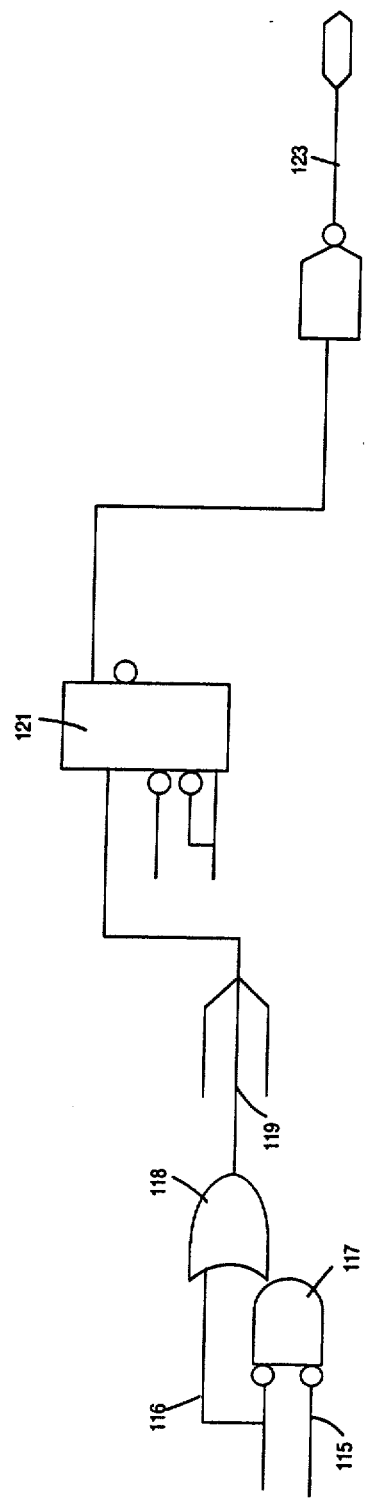

BUS WINDOW INTERLOCK

BACKGROUND OF THE INVENTION

This invention relates to a multiprocessor system in general and, more particularly to a bus window interlock scheme for a multiprocessor system.

The use of a single bus in a multiprocessor system presents several difficulties. In order to accomodate several nodes on a bus, the electrical loading of the bus is significantly increased. This slows down the cycle time of the system. Further, the arbitration time is increased as all of the nodes must wait for a single bus. Also, the use of only one bus presents heavy traffic problems and unnecessary congestion.

One solution to the above problems is the use of two separate busses interconnected through a bus window. This serves to virtually extend the bus to accomodate several nodes while not actually increasing the electrical loading on the bus. Further, it allows the extension of the bus beyond a single cabinet.

However, a difficulty arises with interlock transactions which must be passed through the bus window. When a processor generates an interlock read command to access memory, it must be sent through the bus window. If accepted by the memory, the interlock read command will lock the memory until an unlock write signal is generated. If the memory is already locked, then the interlock read command is stored in a buffer until an unlock write signal from the processor unlocks the memory. Deadlock situations present themselves where the memory is locked, an interlock read is waiting in the buffer and an unlock write signal is behind the interlock read in the same buffer.

SUMMARY OF THE INVENTION

The present invention overcomes the problems of a multiprocessor interlock scheme through the use of control logic interaction between an interlock state bit and interlock buffer residing in the bus window hardware.

The present invention minimizes unnecessary interlock traffic while still giving all devices the ability to efficiently execute interlock instructions.

Multiprocessor systems may use two busses as a system interconnect for several processors, a memory controller, and several input/output adapters. The two busses are linked together through the use of bus window module. The processor bus window module shares its processor bus with the several processors. It watches this bus for commands and write data and passes those transactions through the bus window to the attached memory bus window module. It also accepts all traffic coming from the memory bus window module and passes it out to the processor bus. The memory bus window module shares the memory bus with a single memory controller and several input/output adapters. It accepts all return read data requested by any of the processors and also passes through DMA write commands for the purpose of cache invalidation. It takes in all traffic coming from the processor bus window module and puts it out onto the memory bus.

In order to keep interlock transactions from being lost, an interlock state bit is used in the processor bus window module. This bit determines whether or not interlock transactions will be accepted by the processor bus window module and passed to the memory bus window module's transaction buffer. The interlock state bit is set when an interlock transaction is accepted and reset when an unlock write is accepted by the processor bus window module. When the bit is set, another interlock transaction will not be accepted by the processor bus window module. The processor that generated the interlock will receive an interlock busy confirmation. The processor then waits for an unlock write on the processor bus before retrying the interlock busy transaction.

The memory bus window module incorporates a one deep interlock buffer for interlock read transactions. The interlock buffer consists of a set of latches in several macro-cell arrays and is controlled by logic in one of the macro-cell arrays. This interlock buffer is loaded each time an interlock transaction is placed on the memory bus from the transaction buffer. The possible confirmations that the transaction buffer can receive are acknowledged (ack) i.e. transaction has been accepted, no acknowledgement (noack) i.e. no response to the transaction, busy, i.e. the transaction cannot be accepted at this time or interlock busy i.e. the memory is already locked. The interlock buffer is not used if a confirmation of ack, busy, or noack is received from the memory bus. Busy or noack confirmations are handled by the transaction buffer control and immediately retried. The interlock buffer is "pending" if a confirmation of interlock busy is received. The control logic then waits for an unlock write on the memory bus before retrying the "pending" interlock transaction. Confirmation is checked again and the transaction is retried, from the interlock buffer, if busy or noack is received. Another interlock busy confirmation will cause the interlock buffer logic to wait for another unlock write on the memory bus. An ack confirmation will clear all interlock buffer status. An interlock time out counter is implemented to stop infinite retries.

While the interlock transaction is waiting in the interlock buffer, other CPU transactions are being placed on the memory bus from the transaction buffer. A higher utilization of the buffers in both busses is realized.

Further, processors that have received an interlock busy confirmation wait for an unlock write on the processor bus before retrying the interlock read transaction. An interlock write command from another processor will reset the interlock state bit in the processor bus window module and cause all other CPU's to place their pending interlock transactions on the bus. An unlock write command from an input/output controller would be placed on the processor bus to invalidate cache. It would not reset the processor bus window module's interlock state bit, however it would cause all processors to retry their pending interlock transactions. In order to avoid the useless bus traffic that would result from the processors attempting to send their interlock transactions while the interlock state bit is still set, all unlock write commands from input/output are changed to write commands before they are placed on the processor bus to invalidate each processors cache.

Accordingly, the present interlock scheme overcomes the problems encountered in multiprocessor interlock designs. The present invention minimizes unnecessary interlock traffic while still giving all of the devices the ability to efficiently execute interlock transactions.

BRIEF DESCRIPTION OF THE DRAWINGS

FIGS. 9 and 9a-9d are the bus confirmation logic.

FIG. 10 is the control logic to change unlock write commands.

DETAILED DESCRIPTION OF THE INVENTION

Figure 1:
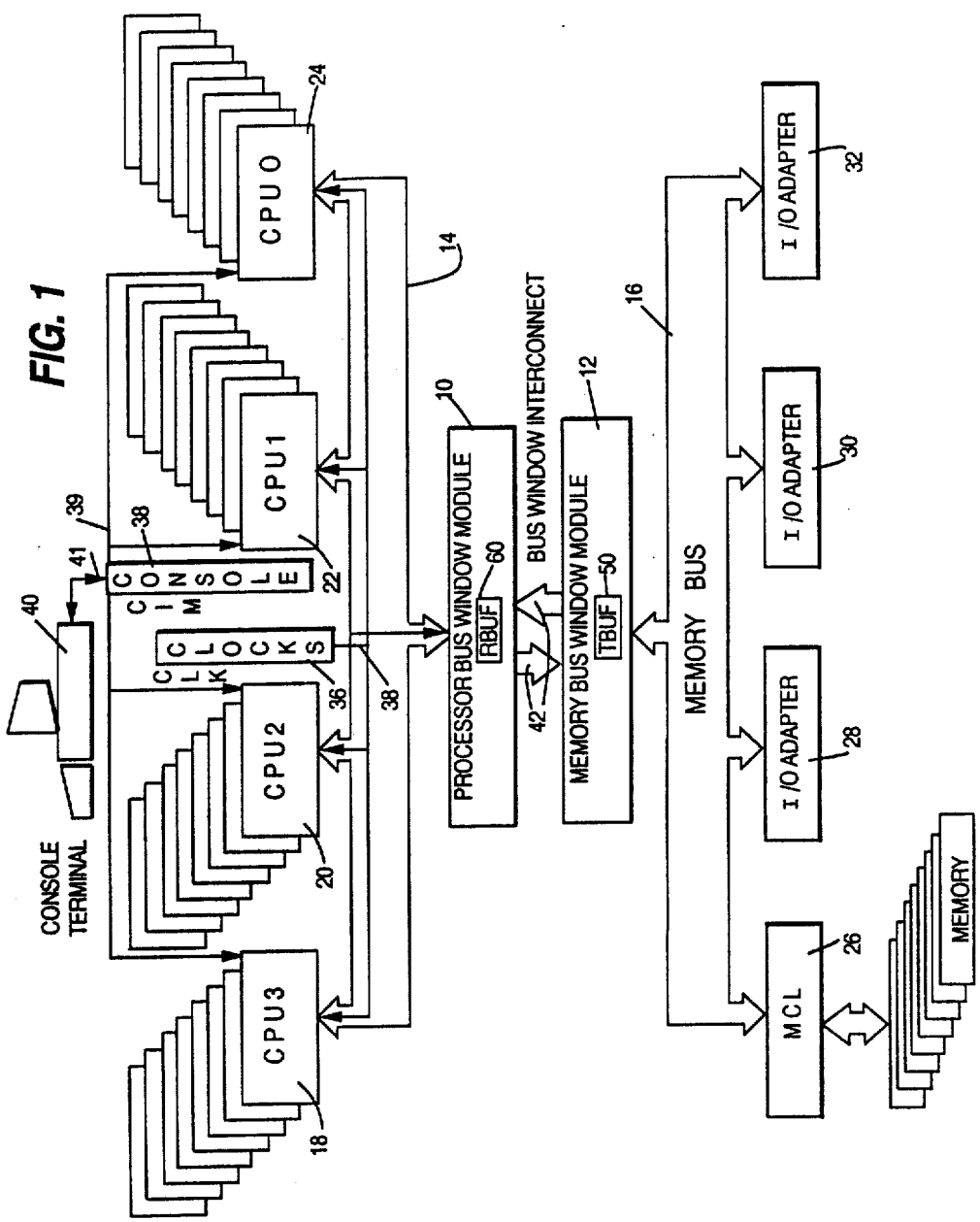
FIG. 1 is a block diagram of a multiprocessor system using the present invention.

Referring to FIG. 1, there is shown a block diagram of a multiprocessor system which utilizes the interlock scheme of the present invention. The system uses two busses, a processor bus 14 and a memory bus 16 as a system interconnect for four processors (18, 20, 22, 24), one memory controller 26 and three input/output adaptors (28, 30, 32). The memory controller 26 accesses a memory 34. The two busses are linked together using a processor bus window module 10 and a memory bus window module 12. The processor bus window module 10 is coupled to the processor bus and further interconnected by cables 42 to the memory bus window module 12. The memory bus window module 12 is coupled to the memory bus 16.

A clock module 36 is coupled to the processors through the processor bus 14 as indicated by line 37. Further, a console interface module 38 is linked with the processors by line 39 and with the console terminal by line 41.

Both the processor bus 14 and the memory bus 16 consist of a specific group of signal connections which allow as many as five intelligent nodes to pass commands and data between each other. The quad-processing system of FIG. 1 uses the bus window modules (10 annd 12) to virtually extend each bus to accommodate eight nodes while not actually increasing the electrical loading on the bus. This system maintains the cycle time while allowing the extension of the bus beyond a single cabinet thus accommodating the several processors, memory and I/O of a multiprocessor system.

Bus Window Module

The link between the processor bus 14 and the memory bus 16 actually consists of two bus window (BW) modules (10 and 12) and a set of interconnecting cables 42. Each of the two BW modules is physically identical although each plays a slightly different role in providing a window between the two busses.

The BW module 10 in the processor cabinet shares its bus with the four processors (18, 20, 22, 24). It watches this bus for commands and write data and passes those transactions through the window to the attached BW module 12 in the memory cabinet. It also accepts all traffic coming from the memory BW module 12 and passes it out to the processor bus 14.

The memory BW module 12 shares the memory bus 16 with the single memory controller 26 (MCL) and from one to three I/O adapters (28, 30, 32). It accepts all return read data requests by any of the processors and also passes through direct memory access (DMA) write commands for the purpose of processor cache invalidation. It takes in all traffic coming from the processor BW module 10 and puts it out onto the memory bus 16.

Each BW module also contains a number of control/status registers (CSRs) and diagnostic registers which are accessible from the processor bus 14.

The multiprocessor system implements transactions which use just the memory bus, transactions which use just the processor bus (BW CSR transactions), and transactions which use both buses. The general transaction categories are outlined below.

Referring to FIG. 1, processor reads and writes to memory are sourced by a CPU on the processor bus 14. This transaction is accepted by the processor BW module 10 and passed over the BW cables 42 to the memory BW module 12. The memory BW module 12 places this command in a transaction buffer (TBUF) 50 and arbs for the memory bus 16. Upon winning arbitration for the bus, the transaction is placed on the memory bus 16 where it will be acknowledged by a memory controller (MCL) 26. If the transaction was a read transaction, read return and read continuation data will be placed on the memory bus 16 by the MCL 26. The memory BW module 12 always accepts read return data destined for a processor. This data will be passed over the BW cables 42 to the processor BW module 10 where it will be latched in a read return buffer 60. The processor BW module 10 will now arb for the processor bus 14 and upon winning the bus, will drive the read return data onto the bus where it can be latched by the appropriate processor.

Processor reads and writes to I/O proceed much the same as processor reads and writes to memory except that, instead of the MCL 26, an I/O adapter (28, 30, 32) will be communicating with the memory BW module 12 on the memory bus 16.

DMA reads occur on the memory bus 16 with read commands being passed from an I/O adapter (28, 30, 32) to the MCL 26 and read return data being passed back from the MCL 26 to the I/O adapter as can be seen in FIG. 1. These commands and read return cycles would cause unnecessary traffic on the processor bus 14. For this reason, they are restricted to the memory bus 16 only and are not transmitted by the memory BW module 12.

DMA writes also occur on the memory bus 16, with an I/O adapter sourcing a write command and write data to the MCL 26. Unlike reads, though, the write command/address cycle must be accepted by the memory BW module 12 and transmitted to the processor BW module 10 to be placed on the processor bus 14. This is because DMA processor write addresses must be seen by the processors (18, 20, 22, 24) in order for them to invalidate data which may reside in their caches. The data cycles accompanying such writes are not transmitted between busses since the caches only require write addresses in order to invalidate their data.

Figure 2:
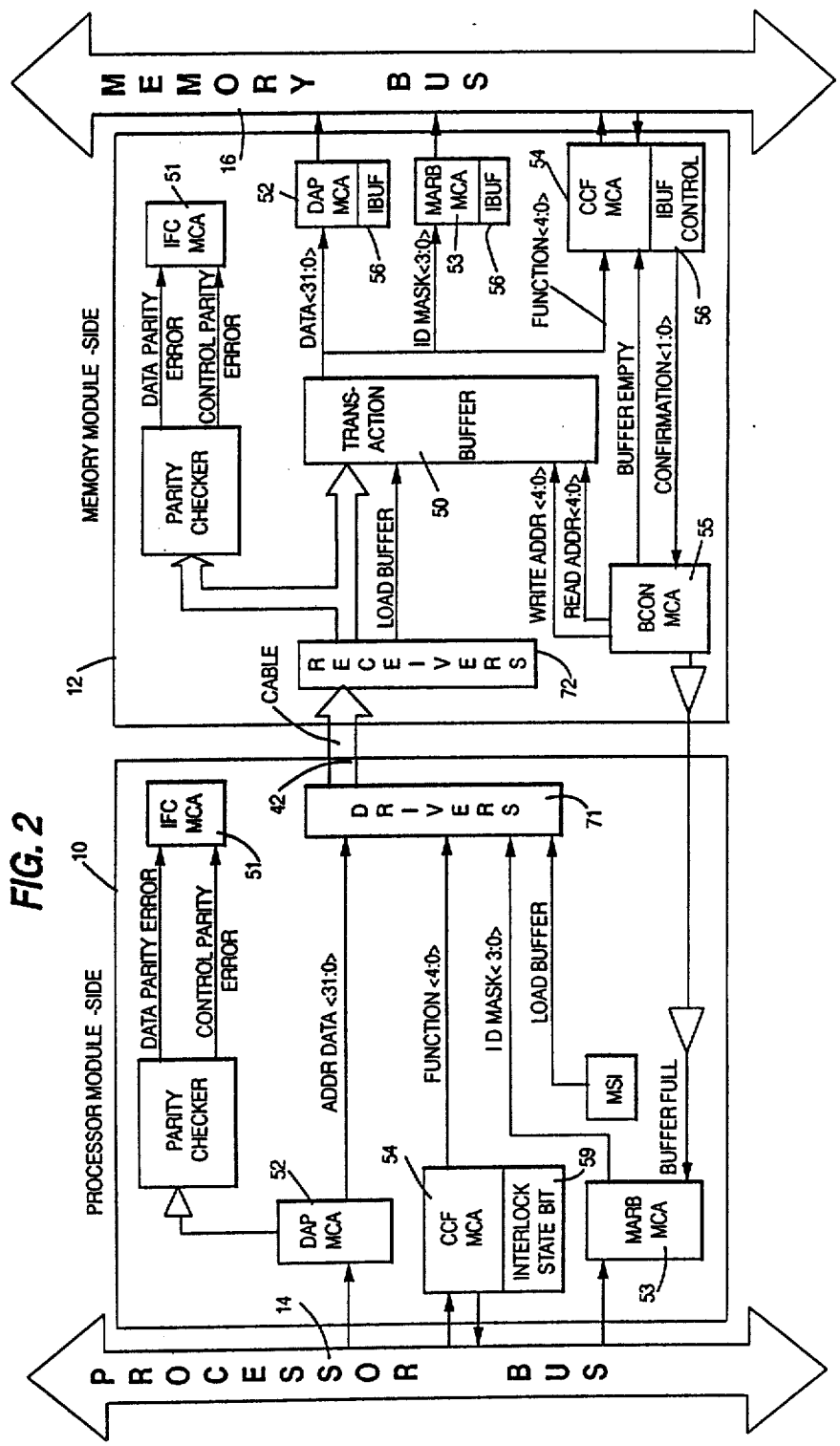
FIG. 2 is a block diagram of a CPU to Memory transaction.
Figure 3:
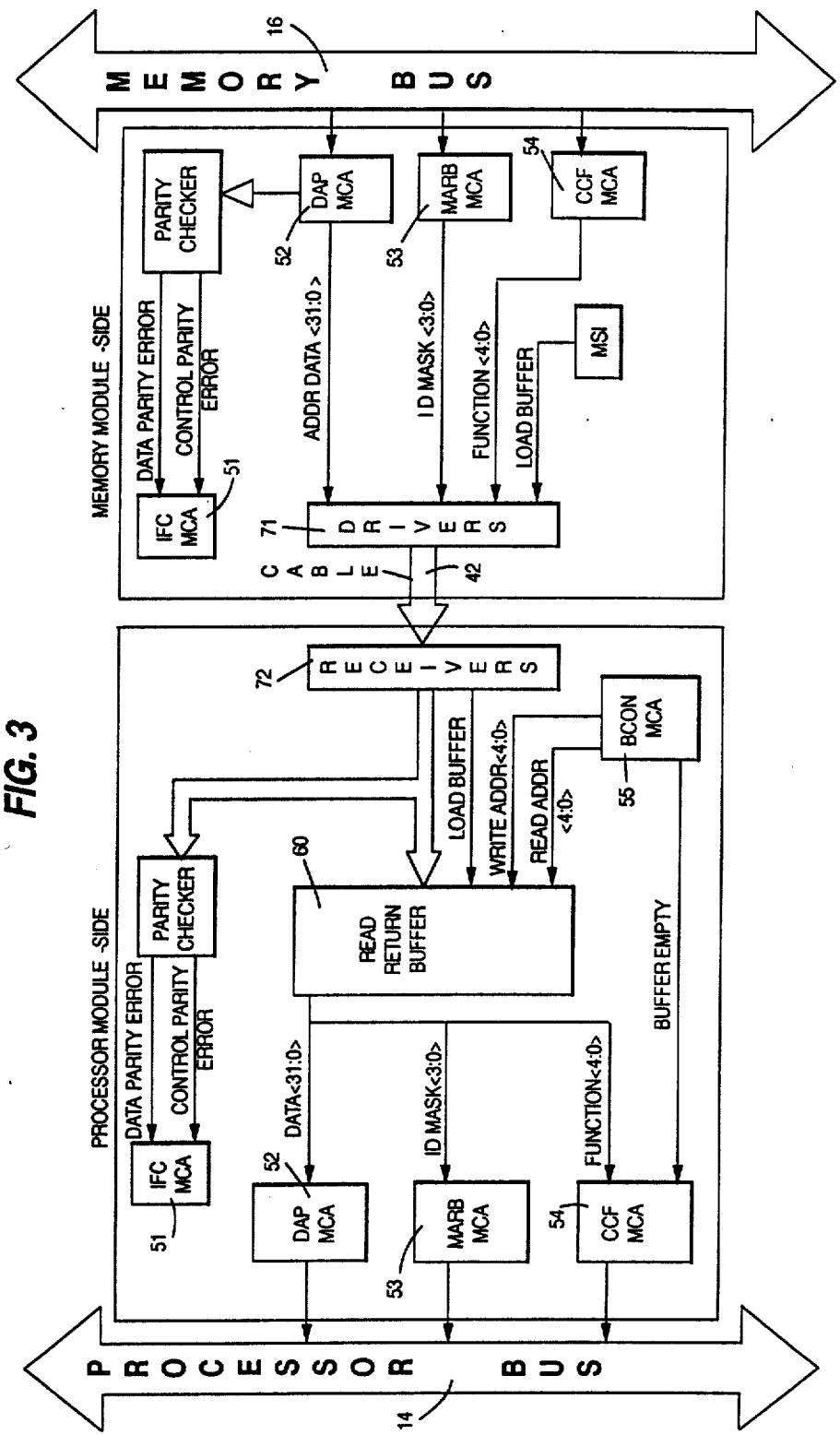
FIG. 3 is a block diagram of a Memory to CPU transaction.
Figure 4:
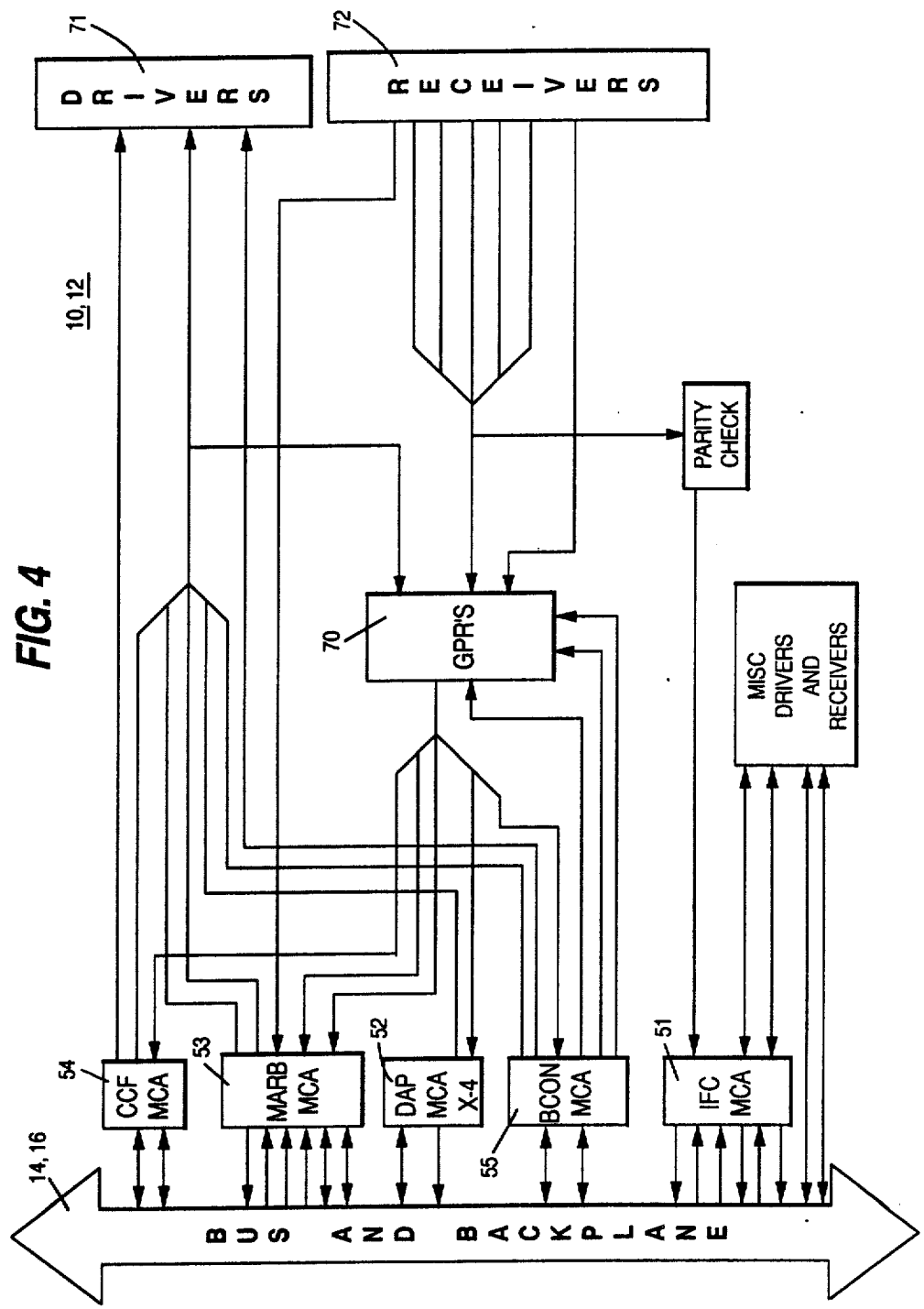
FIG. 4 is a block diagram of a bus window module.

There are 5 different macro cell array (MCA) designs on a bus window module as shown in FIGS. 2, 3 and 4. They are the master arbitration (MARB) 53, control, confirmation, and function (CCF) 54, Buffer Control (BCON) 55, Interrupt and Fault Controller (IFC) 51 and Data Address Path (DAP) 52. The DAP 52 is byte sliced thus there are 4 DAP MCAs for a total of 8 MCAs on each bus window module.

The master arbitration MCA's 53 primary function is to control the arbitration among bus nodes. It is the bus master on each bus controlling the MCL 26, I/O adapter (28, 30, 32) and BW module 12 on the memory bus 16 while controlling the four CPUs (18, 20, 22, 24) and the BW module 10 on the processor bus 14. It inputs the arb and hold lines from each node, along with memory busy, and determines who will use the bus by asserting bus enable for that node. The MARB also generates the arb and hold lines for the BW module.

The MARB controls the bus ID MASK 3:0 signals for the BW module. There are three ports for these signals: the bus port, xmit port and recv port. The bus port is a bidirectional port that transmits and receives the ID MASK lines onto the bus. The xmit port outputs the ID MASK over the cables to the remote BW module. The recv port inputs the ID MASK lines from general purpose registers (GPRs) where they are ready to be placed on the bus. A storage location is used to hold the ID of a local CSR read transaction. This ID is muxed onto the xmit port and placed with CSR read return data.

The last function of the MARB MCA is to control parity for the bus control lines (function and ID/mask). The parity signals use the same bus, xmit and recv ports as the ID MASK signals. Control parity is generated for CSR read return data using a constant read return good function code and the proper ID of the requesting CPU. Parity is generated from the bus ID/Mask lines and the bus Function ID parity and output to the CCF MCA to check for parity errors on the bus.

The CCF MCA 54 has three primary functions: control of the BW module data paths, confirmation of the bus transactions and control of the bus FUNCTION lines. The control part of this MCA covers many functions, including bus control parity error checking, interlock flow control, loading the remote buffers, blocking the arb request line, and CSR data flow.

Bus confirmation is generated by the processor BW module 10 for transactions that are generated by the CPUs. The memory BW module 12 must read bus confirmation (from memory or I/O) and act accordingly. For read return data from memory and I/O, a confirmation is not required by the MCL 26 or I/O adapters (28, 30, 32) thus the memory BW module 12 does not send one. The same holds true for read return data and cache invalidate traffic that is output onto the processor bus 14 by the processor module 10. Thus there is no confirmation from the CPUs to respond to.

The last function of the CCF MCA is to control the bus FUNCTION 4:0 signals for the BW module. There are three ports for these signals: the bus port, xmit port and recv port. The bus port is a bidirectional port that transmits and receives the FUNCTION lines onto the bus. The xmit port outputs the FUNCTION bits to the remote BW module. The recv port inputs the FUNCTION lines from the GPRs when they are ready to be placed on the bus.

The data address path (DAP) MCA 52 is a byte wide chip which is located near the finger pins on the BW module (10 or 12). Together with the CCF 54, BCON 55 and MARB 53, the four DAPs 52 provide the bus interface for the BW module (10 or 12). The function of the DAP is to latch the bus ADDRESS DATA 31:0 lines with every A clock. The data lines are divided along byte boundaries and one byte of data is latched by each DAP. Upon receiving the bus ADDRESS DATA, each DAP 52 will generate byte parity for the byte it has latched. The four resulting byte parity bits will be checked with the bus data parity bit and resulting errors will be sent to the IFC MCA 51. The DAPs 52 will also check the bus ADDRESS DATA lines for the occurrence of BW module CSR addresses. Each DAP 52 will assert a bit if it detects 'correct byte' in a potential CSR address. If all the DAPs are asserting this bit, then the current transaction is a CSR transaction and appropriate action is taken by the module. The bus ADDRESS DATA 31:0 which was latched on an A clock will be output from the DAPs with the signal name XMIT ADDRESS DATA 31:0.

The DAP 52 also is used to accept data from the GPRs which reside on each BW module. The GPRs on the processor BW module and memory BW module form the read return buffer 60 and transaction return buffer 50, respectively. The DAP latches RECV ADDR DATA 31:0 from the GPRs with every A clock. This data is output on the bus with the next B clock via the bidirectional bus ADDRESS DATA 31:0 lines if the arbitration logic asserts BW module BUS ENABLE.

Finally, the DAPs 52 are used to implement interprocessor interrupts in the multiprocessor system. A processor desiring to interrupt another must write to the interprocessor interrupt mask register. By writing the appropriate data during this operation, any processor can interrupt any or all of the other processors.

The Interrupt and Fault Controller MCA 51 is divided into the following three functional sections:
Interrupt Handler
Fault Controller
Diagnostic Mode Controller The interrupt handler portion of the IFC 51 is used to receive and generate the MEMORY INTERRUPT line to the CPUs. The IFC 51 on the memory BW module 12 will receive MEMORY INTERRUPT from the MCL 26 on the memory bus 16 and 'OR' it with its own internal interrupt signal. This logical 'OR' function generates the BW module MEMORY INTERRUPT signal which is passed over the cables to the BW module. The IFC 51 on the processor BW module 10 logically 'ORs' this signal with its own internal interrupt signal and sends this out on the processor bus 14 as MEMORY INTERRUPT. The IFC 51 contains a timeout circuit to determine when the BW module should stop retrying a command and assert its interrupt signal. Additionally, each BW module's IFC contains a bit to inform the CPU if it was responsible for asserting MEMORY INTERRUPT.

The fault controller in the IFC 51 generates the bus FAULT line on the processor bus 14 and asserts BW FAULT DETECT on the memory bus 16. If a fault has occurred on either bus, the IFC is responsible for causing the fault line on the other bus to be asserted too. This is accomplished by passing the BW FAULT line between the two BW modules. The IFC 51 on the processor BW module 10 takes this BW FAULT line and logically 'ORs' it with the bus FAULT DETECT signals from each of the processors. The result of this function is the bus FAULT line which is driven to the processor bus 14 by the IFC on the processor BW module 10. The IFC on the memory BW module 12 takes in the BW FAULT line and logically 'ORs' it with its internal fault detect logic to generate BW FAULT DETECT to the memory bus 16. This causes the MCL 26 to respond by asserting bus FAULT on the memory bus 16.

The Buffer Control MCA 55 is used to control the General Purpose Registers (GPRs) 70 located on each BW module (10 or 12). The GPRs 70 on the memory BW module are used as a transaction buffer (TBUF) 50, that is, they buffer transactions waiting to go on the memory bus or CSR transaction to the memory BW module. The GPRs 70 on the processor BW module are used as a read return buffer (RBUF) 60, that is, they buffer read return data from memory and I/O as well as memory BW CSR and processor BW CSR read return data. The RBUF also contains write commands from I/O to memory. These are passed to the processor bus to perform cache invalidates.

The BCON 55 maintains two pointers, one for the current data being outputted and one pointing to the next location to be loaded with data in the GPR's 70. Additionally, the BCON 55 has circuitry to generate BUFFER EMPTY and BUFFER FULL signals.

Transaction Specifics

Because there are two separate busses, there must be two separate bus controllers. The bus window modules 10 and 12 function as the bus controllers for each bus.

The arbitration among bus nodes is controlled by the MASTER ARBITRATOR (MARB) MCA 53 on both the processor bus 14 and the memory bus 16. The arbitration logic is located in the BW module because of the lack of a bus master on the memory bus. This causes the BW module to control the arbitration between the MCL 26, BW module 12 and I/O adapters (28, 30, 32) on the memory bus 16 as well as control the arbitration between processors (18, 20, 22, 24) and the BW module 10 on the processor bus 14. The BW module is centrally located in the CPU cabinet which shortens the distance between timing critical arbitration signals. The BW module receives the lines bus ARB and bus HOLD from all nodes and outputs BUS ENABLE to each node.

The bus enable process operates by having a node arb for the bus (CPUs and the processor BW module arb for processor bus, while the MCL, memory BW module, and I/O adapters arb for the memory bus) and wait for the corresponding BUS ENABLE signal before placing any data on the bus. The busses are completely separate with two separate controllers thus each bus will have different commanders and different bus traffic.

Present systems require that memory and I/O confirm all CPU commands while read return data from memory or I/O is not confirmed by the commanding node. The BW modules 10 and 12 serve as the interface between the CPUs (18, 20, 22, 24) on the processor bus 14 and memory 34 and I/O 28, 30, 32 on the memory bus 16. Thus the processor BW module 10 has to confirm CPU commands on the processor bus 14 and the memory BW module 12 must check the confirmation sent out by the MCL 26 or I/O adapters for each command sent out by the BW module. For read return data, the MCL 26 is not waiting for a confirmation thus none is given by the memory BW module 12. Likewise, the CPUs do not generate a confirmation for the read return data thus the processor BW module 10 does not wait for one.

The memory controller 26 retains the Memory Busy signal which tells all memory nodes that the MCL 26 is not accepting any more commands. The memory BW module 12 must input this busy signal and follow the appropriate rule of transaction abortion. For the processor bus 14, the processor BW module 10 will have control of the Memory Busy signal. This line is asserted when the processor BW module 10 will not accept any more transactions from the CPUs (18, 20, 22, 24) because the memory BW modules transaction buffers 50 are full. This busy signal is not asserted when a CPU is transmitting on the bus thus transactions on the processor bus will never be aborted due to this memory busy signal.

The arbitrator will insure that whenever the ownership of each bus passes from one node to another there is at least 1 intervening cycle during which the bus has no owner.

Each BW module includes five GPR chips 70 to provide buffering. These chips allow storage of up to 32 forty-five bit wide transactions. The same hardware is employed on each BW module, on the memory BW module it is referred to as the Transaction Buffer, while on the processor BW module it is called the read return buffer. Buffering is implemented on the BW modules in order to allow the receiving BW module time to arbitrate for and win the bus.

The buffer on the memory BW module 12 is referred to as the transaction buffer 50. This is because it stores memory-I/O read and write transactions and CSR transactions. These transactions are received from the processors on the processor BW module 10. They are then sent to the memory BW module 12 where they are stored in the transaction buffer (TBUF) 50. When the TBUF 50 is not empty, the memory BW module 12 will be arbing for the memory bus 16. Upon winning the bus, the transaction in the front of the buffer will be placed on the memory bus 16 where the appropriate memory or I/O node can accept it. If it is a CSR transaction, no ARB will happen and the memory BW module 12 will execute the sequence of a CSR read or write.

If an interlock read command is driven from the TBUF 50 onto the memory bus 16 and the MCL 26 returns an interlock busy confirmation, special hardware on the BW module stores and retries the interlock command as shown in FIG. 2. The existence of this interlock buffer (IBUF) 56 allows the BW module to store away one outstanding interlock read transaction. This enables the BW module to drive following transactions which may reside in the TBUF 50 onto the memory bus 16 while the IBUF 56 waits for the memory to become unlocked. Upon detecting an unlock write command on the memory bus 16, the memory BW module 12 selects the IBUF 56 as the source of the next transaction to be driven onto the bus. The interlock buffer 56 is a one location buffer which resides in the memory BW module 12 interface MCAs.

The buffer on the processor BW module 10 is called the read return buffer (RBUF) 60. This buffer is used to temporarily store read return data and I/O-memory write commands for cache invalidation. The RBUF 60 accepts this data from the memory BW module 12 and data from processor BW CSR reads and buffers it awaiting access to the processor bus 14 as long as the RBUF 60 is not empty. Upon winning the bus, the BW module drives the contents of the next location in the RBUF 60 onto the processor bus 14.

The bus window interconnect 42 is the connection between the two BW modules. It consists of two unidirectional data paths with each path made up of the following signals:

| FUNCTION 4:0 | 5 |

| -continued | |
|---|---|
| ID MASK 3:0 | 4 |
| FUNCTION ID PARITY | 1 |
| ADDRESS DATA 31:0 | 32 |
| DATA PARITY | 1 |
| LOAD REMOTE | 1 |
| CSR ADDRESS | 1 |
| BW FAULT | 1 |
| BUFFER FULL | 1 |
| SLOW CLOCK | 1 |
| MEMORY INTERRUPT/UNJAM | 1 |
| SPARE 2:0 | 3 |
| | 52 |

Each signal is driven differentially from an OR/NOR gate and received differentially by a triple line receiver on the other BW module. With two data paths and differentially driven signals, the total number of differential signals driven over the cables is 208 (52 signals×2 for differential×2 for two data paths).

CPU TO MEMORY TRANSACTION Referring to FIGS. 2 and 4, the BW module 10 receives all transactions that are transmitted on the processor bus 14 by latching the following bus signals on an A clock:

| SIGNAL | # OF BITS | RECEIVING MCA |
|---|---|---|
| BUS FUNCTION 4:0 | 5 | CCF |
| BUS ID MASK 3:0 | 4 | MARB |
| BUS FUNCTION ID PARITY | 1 | MARB |
| BUS ADDRESS DATA 31:0 | 32 | DAPS |
| BUS DATA PARITY | 1 | BCON |

Each DAP MCA 52 generates byte parity for their respective bus ADDRESS DATA lines. These are compared with the bus DATA PARITY signal from the BCON 55 and any error reported to the IFC 51. The MARB 53 and CCF MCAs 54 check parity of the bus ID/MASK and FUNCTION bits with the bus FUNCTION ID PARITY and report any error to the IFC MCA 51 for handling.

The processor BW module 10 will respond with a confirmation to all transactions that are destined for the memory bus or either BW module. All transactions on this bus are latched, checked for parity, and decided if they should be passed to the other BW module 12. The CCF 54 decodes the FUNCTION and checks for a command cycle from a CPU. These transactions are confirmed on the bus with an ack, busy, interlock busy or no response. An illegal function or parity error causes no response, while an interlock busy response depends on the state of the interlock state bit 59 in the CCF 54. A remote busy signal from the memory BW module 12 generates MEMO BUSY on the processor bus 14 (for a minimum of 2 cycles). This signal will not be generated if the bus is being used thus no transactions will be aborted on the processor bus 14. Otherwise, the transaction is acked.

Transactions that are accepted by the processor BW module 10 must be further checked to see if they will stay on this BW module (CSR read or write) or if they will be transmitted to the memory BW module 12. For a transaction destined for the memory BW module 12 the CCF 54 generates LOAD REMOTE and sends this over to the memory BW module 12 with the transaction data. The data is sent out every cycle but it is only latched in the memory BW module 12 if this LOAD REMOTE signal is asserted. The LOAD REMOTE signal is blocked by LOCAL CSR TRANS (generated from decoding the address in the DAP MCAs) if the transaction is determined to be a processor BW module CSR transaction.

The transactions that are received on the memory BW module 12 must be queued before they are placed on the memory bus 16. The current transaction moves along as each bus enable places data on the memory bus 16 and buffered data into the MARB 53, CCF 54, BCON 55, and DAP 52 MCAs. The signal BUFFER EMPTY tells the MCAs that the present data received by the data path MCAs is not valid and thus no action should be taken on that data.

If the transaction is a local CSR transaction, the MARB 53 pulls CSR BUSY to freeze the bus. The CCF 54 asserts the signal SELECT CSR to enable the CSR data path after a 5 cycle delay (to make sure the bus is free). If it is not a CSR transaction, BUFFER ARB is asserted to gain access to the memory bus. The TBUF 50 pointers don't move until a BW BUS ENABLE occurs. The data moves onto the bus on the next B clock while the TBUF 50 places the next cycle into the data path MCAs. The MARB 53 generates a HOLD signal for the data cycles that accompany a write transaction in order to keep the memory bus. If a new transaction comes into the data path 52 MCAs, the MARB 53 generates an ARB line in order to start a new transaction. This transaction must wait until the last transaction has completed on the bus and then start this process over.

The memory 26 and I/O (28, 30, 32) controllers must confirm all transactions that originate from the memory BW module 12. Also, the MCL 26 asserts MEMORY BUSY if it will confirm with a busy response. The BCON 55 uses the MEMORY BUSY signal to abort memory transactions and the actual confirmation code to confirm I/O transactions. This enables memory transactions to be placed on the bus before the confirmation of the last transaction has been processed, thus speeding up the throughput. If MEMORY BUSY is not asserted during the command cycle or the first data cycle of a write transaction, the BCON 55 assumes an ACK confirmation and continues. If the confirmation is a NOACK, the IFC 51 asserts an interrupt and sets the timeout code of MCL 26 quick timeout. If the confirmation is interlock busy, the IBUF 56–58 has the interlock command and retries when memory becomes unlocked. A busy confirmation cannot happen since MEMORY BUSY was not asserted. IF MEMORY BUSY is asserted during the command or the first data cycle, the BCON 55 will discontinue the command (if it is a write transaction) and retry. The BW module will assert its arb line to try to regain the bus when MEMORY BUSY goes away and place the interrupted transaction back on the bus.

The confirmation codes for I/O commands are ack, busy, interlock busy, or no response. Busy or no response causes the BCON 55 to use the last transaction that caused the busy/noack response. This data is output from the GPRs 70 on the next clock so that the busy/noack transaction can be retried. A timeout counter is kept in the IFC 51 to stop the transaction from retrying indefinitely. An ack response causes the BCON 55 to output the next transaction in the TBUF 50 (thus flushing the last transaction). An interlock busy confirmation is not valid from the I/O controllers.

MEMORY TO CPU TRANSACTION

Referring to FIGS. 3 and 4, memory bus transactions differ from processor bus transactions in one important way. On the processor bus 24 the BW module 10 accepts every valid transaction placed on the bus and sends it to the other BW module 12. This is due to the nature of the transactions placed on the processor bus 14; they are CPU operations to memory and I/O. The same is not true on the memory bus. This bus 16 passes DMA transactions between I/O 28, 30, 32 and memory 26 as well as CPU to memory or I/O transactions. Passing all memory bus transactions to the processor bus would cause unnecessarily excessive traffic on the processor bus. For this reason care must be taken by the memory BW module 12 to insure that a memory bus transaction is critical to the correct operation of the CPUs before passing the transaction to the processor BW module 10.

The bus interface on the memory BW module 12 monitors the bus every cycle as every bus node will do. The bus interface will latch the following memory bus signals on every A clock:
BUS FUNCTION 4:0
BUS ID MASK 3:0
BUS ADDRESS DATA 31:0
BUS FUNCTION ID PARITY
BUS DATA PARITY Each cycle, when the bus data is latched, the BW module will check for data/address and function/ID parity errors. This parity checking will occur whether the current bus transaction is intended for the BW module or not. Notification of parity error detection will be sent to the IFC logic which will assert BW FAULT DETECT.

Also with each cycle, the control/confirmation/function logic will decode the function and ID bits looking for very specific combinations of these bits. If an appropriate function and ID are found, the transaction will be prepared to be transferred to the other module. If not, the current transaction will be ignored by the processor BW module. This is accomplished by the CCF logic not asserting XMIT LOAD REMOTE BUF. This signal is asserted by the CCF 54 to inform the processor BW modules RBUF 60 to latch the data coming over the cables with the next B clock. The functions which will be passed to the other BW module are:

Read Return and Read Continuation function codes accompanied by any CPU ID code.

Write commands from an I/O device to memory. (Note that only the command cycle of such commands will be transmitted to the processor BW module, data cycles will be ignored. This is because these commands are only passed in order to invalidate the CPU's caches.)

The memory BW module 12 will accept only read return and read continuation codes destined for the CPUs since I/O-memory read return cycles would cause needless traffic on the processor bus 14.

The write commands will be sent to the processor BW module 10 in order to perform write invalidate operations on the CPUs' caches. Since the caches will not require any data to be passed with the write command, none will be transmitted in the cycles following the command. (The caches require two cycles in order to perform write invalidate functions. This will be facilitated by the processor BW modules arbitration logic not granting the bus to any node between transactions. Thus, a dead cycle will appear on the bus where the first longword of write data would normally be.) In addition to passing all write commands, the CCF logic will detect unlock writes. It is important that upon detecting an unlock write the BW module arb for the bus on the next cycle and upon winning the bus it must drive its latent interlock read transaction (if any). This prevents interlock starvation from occurring on the memory bus.

No confirmation will be sent by the memory BW module 12 to the memory bus 26 under any condition. This is due to the fact that bus nodes do not expect confirmation of read return and read continuation transactions and the write operations that are being accepted are not really intended for the BW module. These write transactions will be acknowledged by the I/O or memory nodes for which they are intended.

The bus signals latched into the bus interface logic on every A clock will be present at the memory BW module's drivers 71 following the next A clock. Once the CCF logic has detected one of the above functions, it will assert the XMIT LOAD REMOTE BUFFER line. This signal informs the processor BW module 10 that the current data being passed is valid and should be latched into the processor BW module's buffers. It also causes the BCON 55 to increment its write pointer after the data is latched.

Upon receiving a transaction and the accompanying RECV LOAD REMOTE BUF signal (this is the name of XMIT LOAD REMOTE BUF at the processor BW module receivers 72.) from the memory BW module 12 the processor BW module 12 will latch the function-/ID/mask, parity bits and data/address into its GPRs 70 with the next B clock. The GPRs 70 operate as a FIFO and when the command comes to the front of the buffer, the MARB 53 logic on the processor BW module 10 requests the processor bus 14 via the BUFFER ARB line to the master arbitration logic. During the time while it is waiting for the bus the GPRs 70 have the current transaction on their output pins and the processor bus interface chips are latching this data into their RECV DATA/ADDR/FUNC/ID/PARITY . . . ports with every A clock.

Upon receiving a BW BUS ENABLE signal from the MARB 53, the processor bus interface drives the transaction onto the processor bus 14. With the assertion of BW BUS ENABLE the BCON 55 moves its pointers to the next location in the GPRs 70. The GPRs 70 place the data from this new location on their output pins during the next B cycle and the bus interface chips latch this new data on the next A cycle. If BW BUS ENABLE remains asserted this process of moving the pointers and driving new data on the bus will continue. BW BUS ENABLE will continue to be asserted for multiple cycles in the case of a read return data function followed by read continuation data functions. In the case where the GPRs 70 contain multiple distinct commands, the RBUF 60 will get flushed due to the fact that the processor BW module 10 has memory priority. That is, the processor BW module 10 will be granted BUS ENABLE every time it asserts its ARB line as long as no other node is asserting bus HOLD. The MARB 53 logic will insert a dead cycle between distinct commands.

After the command is placed on the processor bus 14, the BW module never has to wait for confirmation. The CPUs never send any confirmation for read return and read continuation data. Also, the write invalid commands are not destined for any node resident on this bus, so they also will not receive any confirmation.

INTERLOCK SCHEME

Interlock reads and unlock writes are special transactions that must be dealt with using specific hardware on the BW module. The problems occur when the processor BW module 10 accepts an interlock read to memory and the memory BW module 12 gets an interlock busy confirmation back from memory 26 that is currently locked by another interlock read transaction. The BW module 12 must store this interlock read transaction until memory becomes unlocked and then retry the interlock read.

Figure 6:
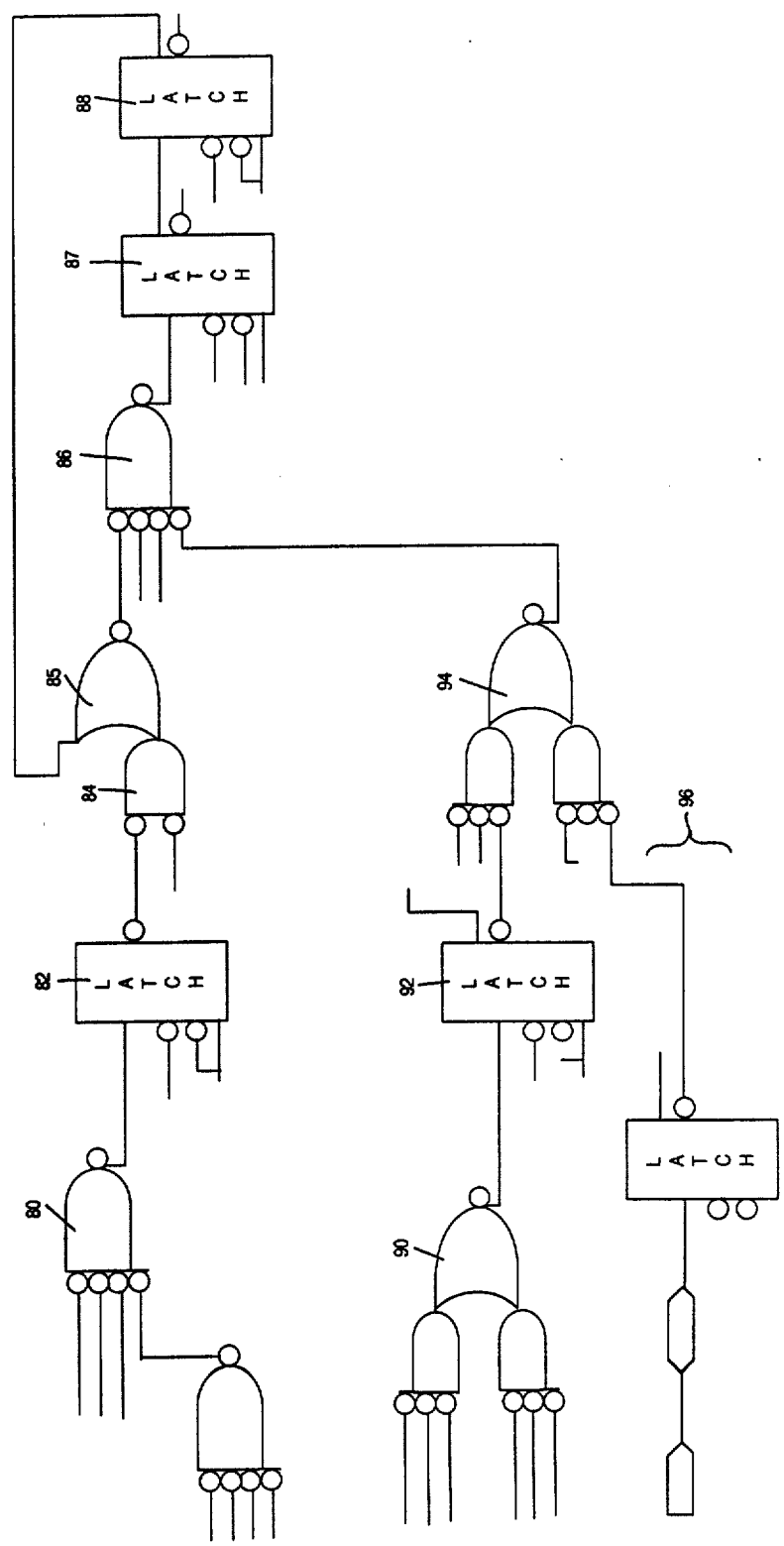
FIG. 6 is the control logic for the interlock state bit.
Figure 8:
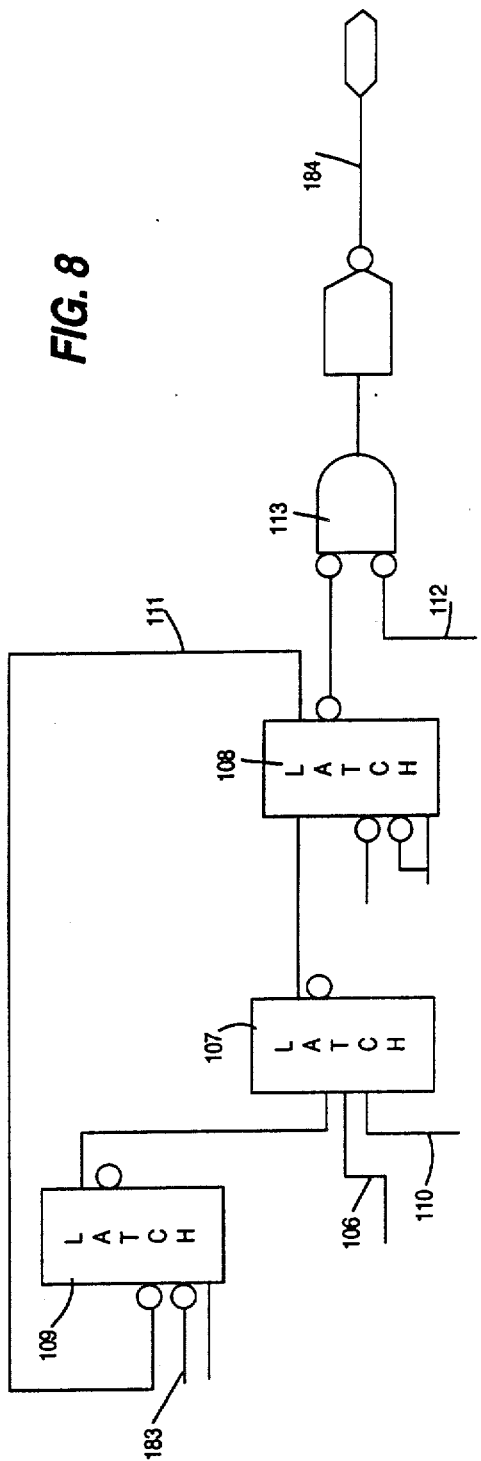
FIG. 8 is the control logic for storing an interlock transaction.
Figure 9B:
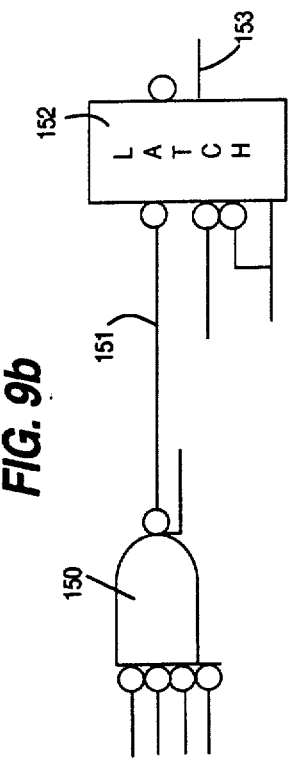
Figure 9C:
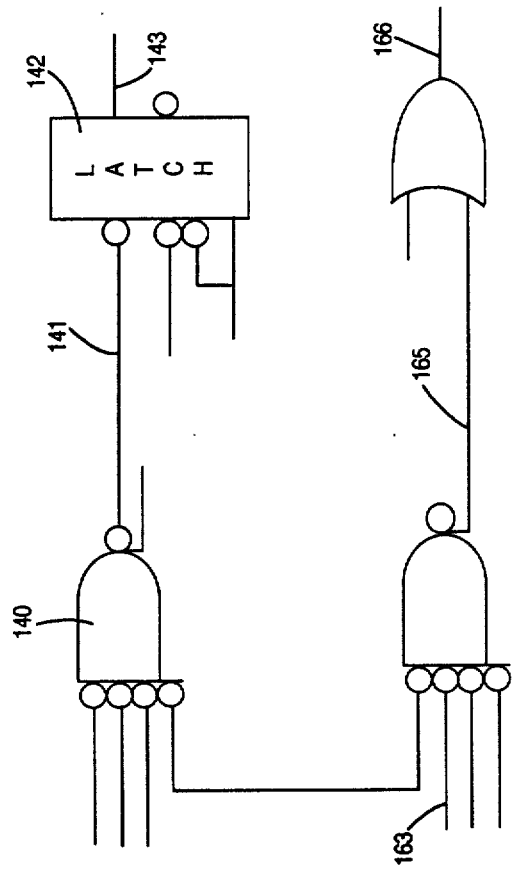

The hardware needed to keep the interlocks in order and not congest the flow of transactions between BW modules consists of an interlock state bit 59 and interlock/unlock decode logic as shown in FIGS. 2, 6 and 9. Both are located on the processor BW module 10. There is also a special interlock buffer (IBUF) 56 to hold one interlock transaction and decode logic to detect unlock writes on the memory bus as shown in FIGS. 2, 7, 8, 9a–c and 10. These are located in the data path MCAs on the memory BW module 12.

In order to keep interlock transactions from being lost, an interlock state bit 59 has been implemented in the processor BW module 10. This bit determines whether or not an interlock transaction will be accepted by the processor BW module 10 and passed to the memory BW module's transaction buffer 50. The bit is set when an interlock transaction is accepted and reset when an unlock write is accepted by the processor BW module 10. When the bit is set, another interlock transaction will not be accepted by the processor BW module 10. The processor that generated the interlock will receive an interlock busy confirmation. The processor then waits for an unlock write on the processor bus 14 before retrying the interlock busy transaction.

Referring to FIG. 6, there is shown a control logic circuit residing in the CCF 54 for implementing the interlock state bit 59 in the processor BW module 10. In operation, the Nand gate 80 detects an interlock read transaction from the processor bus 14. The interlock condition is latched 82 and fed to an And gate 84. The interlock condition is checked by the And gate 84 to insure that no parity errors occurred. Next the interlocked condition (state bit asserted) is fed into a loop consisting of a Nor gate 85, a Nand gate 86 and latches 87 and 88. The loop maintains the state bit asserted, indicating a locked condition, until a clear lock signal is received by Nand gate 86.

An unlock write signal is detected by a Nor gate 90, latched 92 and checked for parity errors or timeout conditions before being fed to Nor gate 94. The output of Nor gate 94 is the clear lock signal that is fed to Nand gate 86 thus deasserting the interlock state bit.

A special clear interlock bit which takes path 96 can force a clear lock signal from Nor gate 94 to deassert the state bit.

The memory BW module 12 incorporates a one deep interlock buffer 56 for interlock read transactions. The IBUF 56 consists of a set of latches in the CCF, MARB, DAPs and BCON MCAs and is controlled by logic in the CCF MCA. BUS FUNCTION 4:0 is stored in the CCF MCA; BUS ID MASK 3:0 and BUS FUNCTION ID PARITY are stored in the MARB MCA; BUS ADDRESS DATA 31:0 is in the DAP MCA's. These MCA's will hold the interlock transaction in the buffer when an interlock busy confirmation is returned from the MCL 26. This IBUF 56 is loaded each time an interlock transaction is placed on the memory bus 16 from the transaction buffer 50. The IBUF 56 is not used if a confirmation of ACK, BUSY, or NOACK is received. Busy or noack confirmations are handled by the transaction buffer control and immediately retried. The IBUF 56 is "pending" if a confirmation of interlock busy is received. The control logic then waits for an unlock write on the memory bus before retrying the "pending" interlock transaction. Confirmation is checked again and the transaction is retried, from the IBUF 56, if busy or noack is received. Another interlock busy confirmation will cause the IBUF logic to wait for another unlock write on the memory bus. An ACK confirmation will clear all IBUF status. An interlock timeout counter is implemented to stop infinite retries.

While the interlock transaction is waiting in the IBUF 56, other CPU transactions are being placed on the memory bus 16 from the transaction buffer 50. A higher utilization of the buffers and both busses is realized.

Read Interlock Transaction Flow

An interlock transaction is accepted by the processor BW module 12 only when the interlock state bit 59 is not asserted. When the transaction is accepted, the interlock state bit 59 is then asserted which blocks all other interlock transactions by sending out an interlock busy confirmation to the corresponding transaction.

The first interlock transaction is transferred to the TBUF 50 in the memory BW module 12 and waits for its turn on the memory bus 16. As the interlock transaction is placed on the bus, the function code is decoded in the CCF 54 and the signal STORE INTERLOCK is sent to all the data path MCAs to store the interlock transaction in the IBUF 56. The output of the IBUF 56 is muxed with the TBUF data and output on the bus when the interlock transaction is retried.

Figure 7:
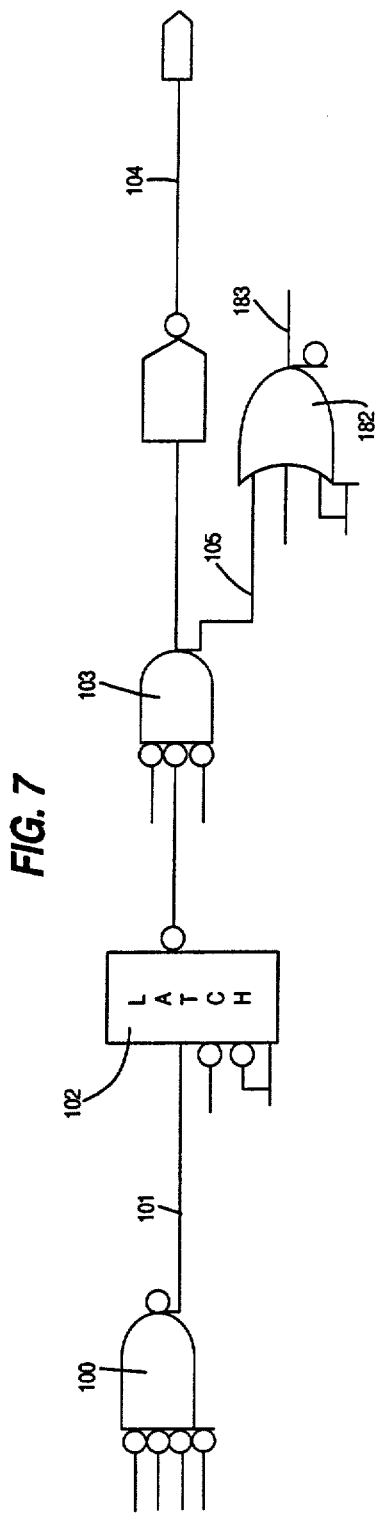
FIGS. 7, 7a and 7b are the control logic for the interlock buffer.

Referring to FIG. 7 there is shown the control logic on the memory BW module 12 side for interlock transaction data output from the TBUF 50 to the CCF MCA 54. Nand gate 100 serves to determine if the CCF 54 has received an interlock command. A received interlock command 101 is then latched 102 and fed to And gate 103. When the memory bus enables the data at And gate 103, a bit is set by signal 104 to allow the interlock command data to be stored in the interlock buffer 56.

Simulatneously, an internal store interlock signal 105 is fed through Nor gate 182 and output as signal 183 to allow storage of the interlock data into the interlock buffer. FIG. 8 shows the logic which stores the interlock function bits. The function bits are received by the multiplexer (MUX) 107 from the TBUF on line 106. The bits are latched 108 and fed to And gate 113. At the same time, the data is fed to latch 109 on line 111. When both the store interlock signal 183 and the A clock are true, the data on line 111 is latched into the interlock buffer IBUF 56. An interlock mux select line 110 functions to send the interlock data from the IBUF back to the memory bus 16 when an unlock write signal is received. The interlock mux line 110 selects the IBUF data path 180 to be latched 108 and sent to And gate 113. When the memory bus is enabled on line 112, the function bits are output through gate 113 to the memory bus 16 on line 184.

In normal operation, the interlock buffers are over written each time an interlock transaction is output to the memory bus 16. There is no possibility of losing an interlock transaction because the processor BW module 10 returns interlock busy confirmation when a second interlock command is issued by another CPU (18, 20, 22, 24). An unlock write by the CPU that generated the interlock read will deassert the interlock state bit 59 allowing more interlock read commands. Thus there will be no other interlock reads in the TBUF 50 while the first interlock read is held in the IBUF 56.

Once the transaction is placed on the memory bus 16, a corresponding interlock busy confirmation (no ack or busy would cause the BCON to retry the same transaction) starts an interlock pending bit that waits for a unlock write on the memory bus. When an unlock write transaction occurs, the CCF 54 asserts SEND INTERLOCK to select the interlock muxes and arb for the bus. Bus enable is asserted and the interlock transaction is output onto the bus. If another transaction is waiting from the TBUF 50 it must continue to wait until the interlock transaction has been confirmed.

The IBUF 56 continues to retry the transaction if a confirmation of busy or noack is received. Interlock busy confirmation deasserts SEND INTERLOCK but causes the interlock pending bit to stay asserted to watch for another unlock write. An ack confirmation for the interlock transaction deasserts the SEND INTERLOCK signal and the interlock pending bit to complete the interlock transaction.

The read return data from the interlock read transaction is sent back to the originating CPU which generates an unlock write transaction. This unlock write is accepted by the processor BW module 10 which causes a deassertion of the interlock state bit 59. Another interlock read can then be sent through to memory.

Referring to FIGS. 9-9c, there is shown the confirmation logic used on the processor and memory busses. FIG. 9A shows the bus confirmation bits which are latched off of the memory bus from the MCL and I/O adapters. Latch 130 obtains the confirmation bits on lines 131 and 132 and sends them to the circuits shown in FIGS. 9b and 9c where they are checked.

Figure 7A:
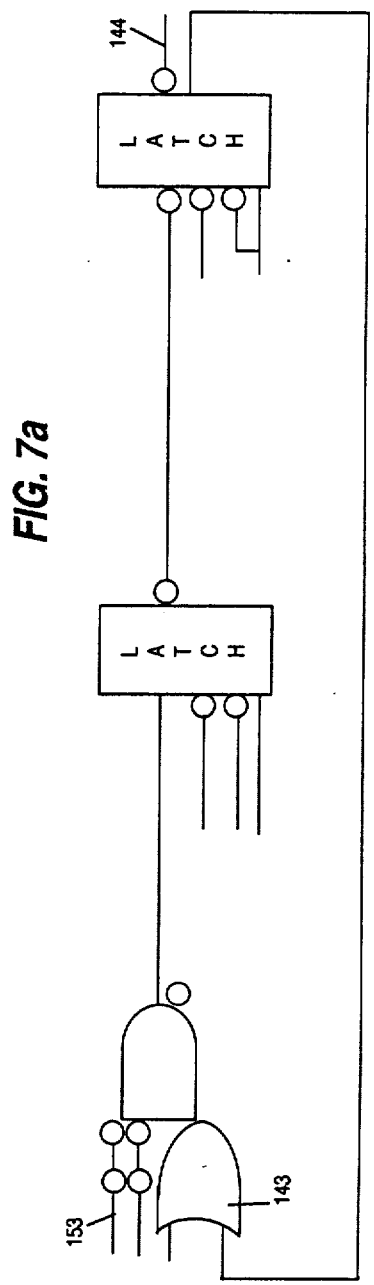

FIG. 9c Nands the confirmation bits in gate 140. Confirmations are obtained according to the table of FIG. 9d. If an interlock busy is obtained on line 141 and latched 142, a start interlock pending signal 143 is sent. A start interlock pending signal 143 is sent to the circuit in FIG. 7a which begins an interlock pending state 144.

Confirmation bits sent to FIG. 9c are Nand-ed in gate 150. If a buffer ack signal is obtained on line 151 and latched 152, then a stop interlock pending signal on line 153 is sent. The stop interlock pending signal 153 is sent to FIG. 7a where it prevents the interlock pending signal on line 144 from being sent.

Figure 7B:
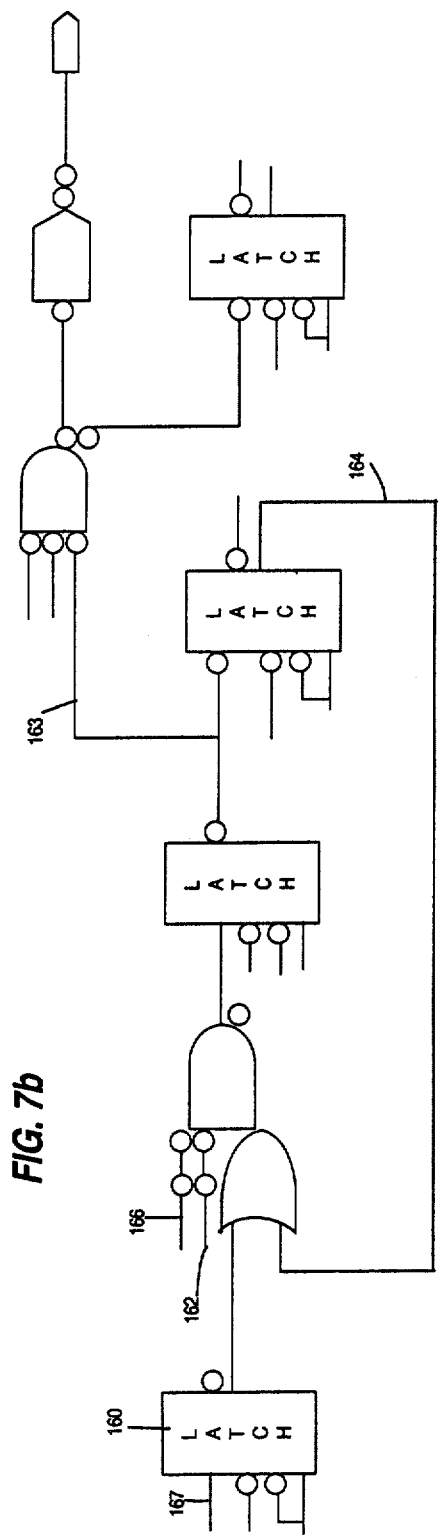

FIG. 7b is the control logic for when an interlock is pending waiting for an unlock write signal. An unlock write signal latched at 160 is fed to Nand gate 161. If an interlock pending signal is present on line 162 then a send interlock signal is generated on line 163 to release the data in the IBUF. Loop 164 functions to allow the send interlock 163 to continue to arb for the bus if it is busy.

Referring to FIG. 9c, if a send interlock signal on line 163 is Nand-ed with the confirmation bits and an interlock busy signal is obtained on line 165, then a stop send interlock signal is generated on line 166 so that the IBUF will not continue to send interlock data but will wait for another unlock write. FIG. 7b shows the stop send interlock signal on line 166 which will prevent the send interlock signal 163 from being sent until another unlock write is detected on line 167.

Referring to FIG. 9 there is shown the confirmation logic on the processor bus. When the state bit 59 is locked from the circuit in FIG. 6, the signal is sent to the And gate 171 on line 170. If there are no parity errors, timeouts, or unlock writes and an interlock transaction has occurred on line 172 then an interlock busy signal from Nor gate 173 is generated. The interlock busy signal is latched (174 and 175) and sent as the confirmation on line 176.

Processors that have received an interlock busy confirmation, wait for an unlock write on the processor bus 14 before retrying the interlock read transaction. An unlock write command from another processor will reset the interlock state bit 59 in the processor BW module 10 and cause all other CPUs to place their pending interlock transactions on the bus. An unlock write command from an I/O controller would be placed on the processor bus 14 to invalidate cache. It would not reset the processor BW module's interlock state bit 59 (it is not accepted by the processor BW module) but it would cause all processors to retry their pending interlock transactions. This would cause useless bus traffic as the processor BW module's interlock state bit 59 is still set and each interlock transaction would receive an interlock busy confirmation. For this reason, all unlock write commands from I/O are changed to write command (non-unlock) before they are placed on the processor bus to invalidate each processor's cache.

This is done by inverting function bits 2 and 1 in the memory BW module 12 while an unlock write command is being passed from the memory bus to the processor BW module 10. All other function codes are not changed. The three unlock write functions affected are listed below. Size of the write command does not matter as the command/address cycle is used for invalidates only and thus no data is placed with the write command on the processor bus.

Write Longword Unlock Masked --- Write Octaword Masked

Write Quadword Unlock Masked --- Write Longword

Write Octaword Unlock Masked --- Write Longword Masked

FIG. 10 shows the logic involved to change an unlock write signal to a write signal for processor invalidates. The ID bit on line 115 must be set to indicate that the transaction is on the memory bus and an unlock write signal must be detected on line 116. When both are true as Anded together by gate 117, then the Exclusive Or gate 118 flips the bits on the bus function line to change the unlock write to a write signal. The XOR function signal 119 is sent through latch 121 and transmitted on line 123 to the processor BW module.

Figure 5:
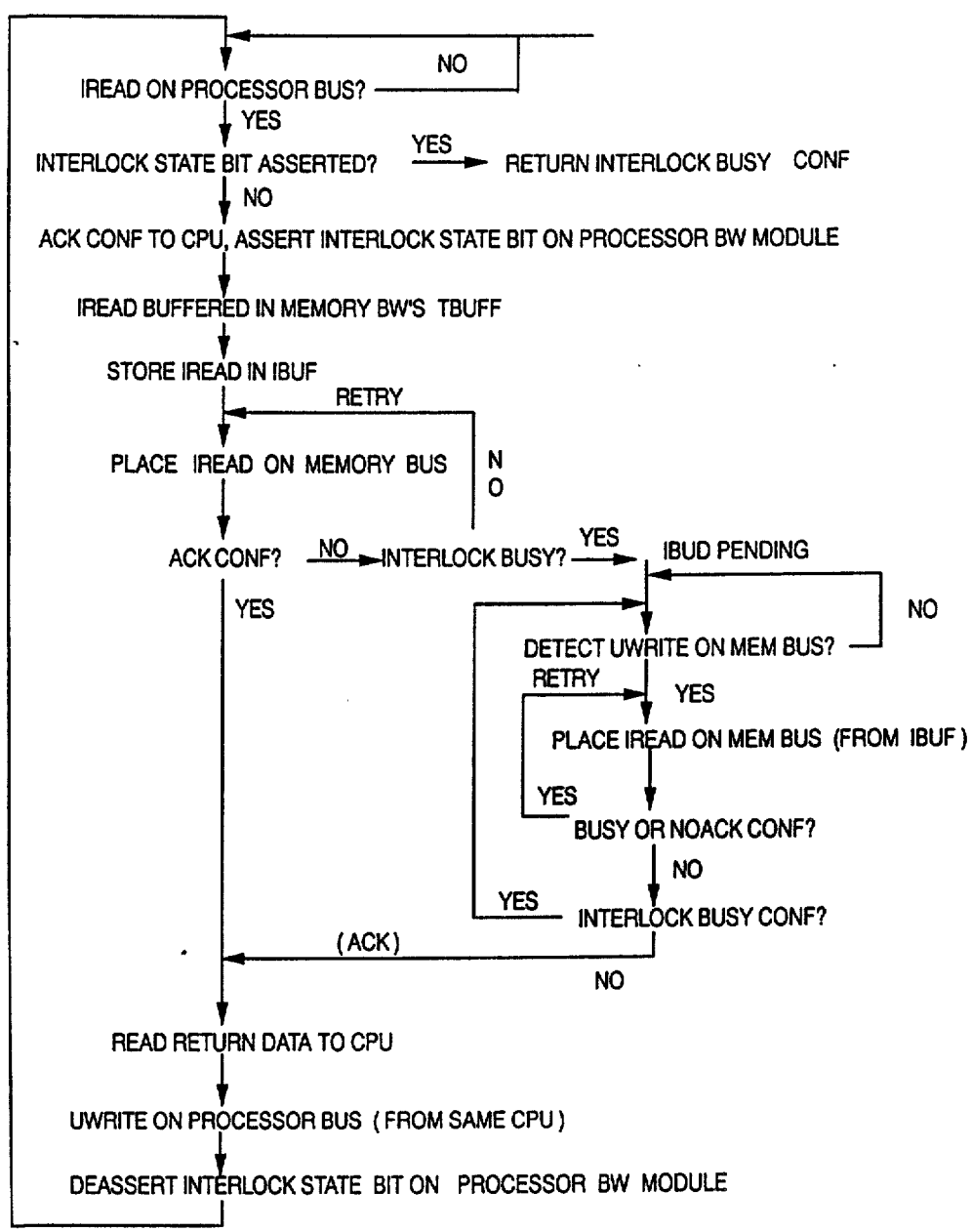
FIG. 5 is a flow diagram for an interlock transaction.

A flow diagram of the above interlock transactions is illustrated in FIG. 5.

Overall, the logic circuits function to prevent a deadlock situation and to provide a more efficient use of the processor and memory busses.

TIMEOUT GENERATOR

A multiprocessor system implements a retry mechanism in case of a busy, interlocked or no ack confirmation code. The BCON 55 is designed to keep retrying the current command until it gets an acknowledge confirmation on the bus CONFIRMATION 1:0 lines. In order to cause the BCON 55 to flush the current transaction and move on to the next, a timeout circuit is located in the IFC MCA 51. The timeout clock is implemented with a two bit counter which uses the bus SLOW CLOCK signal as its clock. The counter is started with the assertion of BUFFER ARB by the CCF 54. The assertion of this signal indicates that the BCON 55 has a new command in its buffer which it would like to place on the bus. Once a BW BUS ENABLE signal is detected by the IFC 51, the possibility of a 'No access to bus' timeout condition is ruled out. Counting continues pending the receipt of the BUS CONFIRMATION 1:0 lines two cycles later. If the transaction was acknowledged, the counter is reset and waits for another BUFFER ARB signal to begin again. If the confirmation is one of busy or no response, the confirmation type is stored and counting continues pending retry. If an interlocked busy confirmation is returned the transaction is placed in an interlock buffer and retried following the next occurrence of an unlock write. The next transaction resident in the BW module GPRs 70 driven by the BCON logic and the timeout counter is reset. If the timeout counter detects a timed out function, (this takes 750 to 1250 usec) it asserts FUNCTION TIMEOUT. This signal causes the BCON to move on the next transaction in the GPRs 70 and begin trying to send it to the bus. It also causes Memory Interrupt to be asserted if interrupts are enabled and the timeout code to be frozen in BW CSR0. Finally, FUNCTION TIMEOUT causes the bus error address register (BW CSR6) to be loaded with the address that was present in the DAPs 52 when the transaction timed out.

What is claimed is:

1. A system for implementing an interlocking scheme between a plurality of processors and a memory controller coupled to a first bus and a second bus respectively, comprising:
    (a) a first bus window module coupled to said first bus, said first bus window module receiving interlock transactions from said plurality of processors through said first bus;
    (b) a second bus window module coupled to said second bus and further coupled to said first bus window module, said second bus window module receiving one of said interlock transactions from said first bus window module and passing said one of said interlock transactions to said second bus, and wherein said first and second bus window modules further include a deadlock prevention circuit operating in said first and second bus window modules to prevent a system deadlock when transferring said interlock transactions.

2. A system according to claim 1 wherein said interlock transactions are interlock reads and unlock writes.

3. A system according to claim 2 wherein said deadlock prevention circuit for transferring interlock transactions in said first bus window module comprises:
    (a) a state bit located in said first bus window module, said state bit being set when an interlock transactions is accepted from one of said plurality of processors through the first bus; and
    (b) a confirmation signal provided to one of said plurality of processors when an interlock transaction is generated by said one processor, said confirmation signal depending upon the setting of the state bit.

4. A system according to claim 3 wherein said confirmation signal is an interlock busy signal if the state bit is set, said interlock busy signal keeping the processors from passing interlock transactions to the first bus until an unlock write is detected on said first bus.

5. A system according to claim 3 wherein said deadlock prevention circuit for transferring interlock transactions in said second bus window module comprises:
    (a) an interlock buffer located in said second bus window module;
    (b) a transaction buffer located in said second bus window module for receiving the one interlock transaction from said first bus window module, said transaction buffer further passing the one interlock transaction to said memory controller through the second bus and simultaneously stroking the one interlock transaction in said interlock buffer for subsequent retransmission of said one interlock transaction to said memory controller;
    (c) a transaction confirmation signal provided to said transaction buffer when the one interlock transaction is passed to said memory controller, said transaction confirmation signal depending upon the state of the memory controller.

6. A system according to claim 5 wherein said transaction confirmation signal is an interlock busy if the memory controller is locked, said interlock busy signal keeping the interlock buffer pending until an unlock write is detected and then retransmitting said one interlock transaction stored in said interlock buffer.

7. A system according to claim 5 wherein said transaction confirmation signal is a busy signal thus making the transaction buffer retry the one interlock transaction.

8. A system according to claim 5, wherein said transaction confirmation signal is a noack if there is no response thus making the transaction buffer retry the one interlock transaction.

9. A system according to claim 5, wherein said transaction confirmation signal is an ack signal if the interlock transaction is accepted by said memory controller, said ack signal indicating a clear status of said interlock buffer.

10. A system according to claim 5 wherein said interlock buffer is a one deep buffer.

11. A system according to claim 5 wherein said system is performing a direct memory access operation, further comprising:
    (a) an I/O device coupled to said second bus; and
    (b) means for changing an unlock write signal from said I/O device to a write signal before passing said write signal through the first bus window module to said first bus, said write signal being used to invalidate data in a cache memory in said one processor.

12. A method for implementing an interlocking scheme between a plurality of processors and a memory controller coupled to a first bus and a second bus, respectively, comprising the steps of:
    (a) generating interlock transactions from said processor and said memory controller; and
    (b) transferring one of said interlock transactions from one of said processors to said memory controller via a first bus window module and a second bus window module; and
    (c) operating a deadlock prevention circuit in said first and second bus window modules to prevent a system deadlock when transferring said one interlock transaction.

13. A method according to claim 12 wherein said step of generating interlock transactions creates interlock read and unlock write commands.

14. A method according to claim 13 wherein said step of operating a deadlock prevention circuit, further comprises the steps of:
  (a) setting a state bit located in the first bus window module when said one interlock transaction is accepted from said one processor through the first bus;
  (b) generating an interlock busy signal whenever an interlock transaction is generated from a processor while said state bit is set;
  (c) not accepting said interlock transaction into said first bus window module when the interlock busy signal is generated;
  (d) resetting said state bit when an unlock write signal is accepted by said first bus window module;
  (e) passing said one accepted interlock transaction to a transaction buffer in the second bus window module;
  (f) storing said one accepted interlock transaction from said transaction buffer into an interlock buffer in said second bus window module;
  (g) attempting to simultaneously load said one accepted interlock transaction from said transaction buffer onto the second bus;
  (h) keeping said interlock buffer pending if said transaction buffer receives an interlock busy signal through said second bus; and
  (i) retrying a pending interlock buffer transaction after an unlock write signal is received on said second bus.

15. A method according to claim 14 wherein said step of storing said one accepted interlock transaction into the interlock buffer is carried out by using a one-deep interlock buffer.

16. A method according to claim 14 further comprising the step of retrying a transaction buffer interlock transaction if said transaction buffer receives a busy signal through said second bus.

17. A method according to claim 14 further comprising the step of retrying a transaction buffer interlock transaction if said transaction buffer receives a noack signal through said second bus.

18. A method according to claim 14 further comprising the step of indicating a clear status for the interlock buffer if an ack signal is received by said interlock buffer.

19. A method according to claim 14 for attempting a direct memory access operation, further comprising the steps of:
  (a) changing an unlock write signal generated by an I/O device on said second bus to a write signal in the second bus window module; and
  (b) passing said write signal through said first bus window module to invalidate data in a cache memory in said one processor.

* * * * *